(12) United States Patent
Cabral Betancor

(10) Patent No.: US 9,789,519 B2
(45) Date of Patent: Oct. 17, 2017

(54) RUG CLEANING DEVICE

(71) Applicant: Antonio Cabral Betancor, Santa Cruz de Tenerife (ES)

(72) Inventor: Antonio Cabral Betancor, Santa Cruz de Tenerife (ES)

( * ) Notice: Subject to any disclaimer, the term of this patent is extended or adjusted under 35 U.S.C. 154(b) by 236 days.

(21) Appl. No.: 14/420,986

(22) PCT Filed: Jul. 18, 2013

(86) PCT No.: PCT/ES2013/070519
§ 371 (c)(1),
(2) Date: Feb. 11, 2015

(87) PCT Pub. No.: WO2014/027125
PCT Pub. Date: Feb. 20, 2014

(65) Prior Publication Data
US 2015/0239017 A1  Aug. 27, 2015

(30) Foreign Application Priority Data

Aug. 14, 2012 (ES) ................................ 201230882 U
Feb. 12, 2013 (ES) ................................ 201330162 U

(51) Int. Cl.
*B08B 3/02* (2006.01)
*D06G 1/00* (2006.01)
*B60S 3/00* (2006.01)

(52) U.S. Cl.
CPC ................ *B08B 3/02* (2013.01); *B60S 3/008* (2013.01); *D06G 1/005* (2013.01)

(58) Field of Classification Search
None
See application file for complete search history.

(56) References Cited

U.S. PATENT DOCUMENTS 4,880,026 A * 11/1989 Ferre ........................ B60S 3/002
134/123

FOREIGN PATENT DOCUMENTS

| ES | 2016512 A6 | 11/1990 |
| JP | H09192619 A | 7/1997 |
| JP | 2006068209 A | 3/2006 |
| KR | 20020076500 A | 10/2002 |
| KR | 20070074446 A | 7/2007 |

\* cited by examiner

*Primary Examiner* — Michael Barr
*Assistant Examiner* — Jason Riggleman
(74) *Attorney, Agent, or Firm* — Hayes Soloway PC

(57) ABSTRACT

Mat cleaning device comprising at least one washing basket having a cage-like shape and intended to accommodate the mat in an adjacent arrangement, and in a non-folded position. The basket comprises at least a metallic mesh, having a V configuration defined by two convergent sections converging in a lower edge and having a free end opposite to the lower edge in each convergent section, through which a mat is introduced in the basket, and two side ends delimiting the cage sides. The device comprises a support to which the basket is rotationally linked through rotating elements, in such a way that it can rotate over a transversal axis or a longitudinal axis.

13 Claims, 7 Drawing Sheets

RUG CLEANING DEVICE

OBJECT OF THE INVENTION

The present invention may be included within the technical field of industrial cleaning. Likewise, it may also be included in the automotive field, in particular in that of car accessories, such as mats.

Particularly, the object of the invention refers to a mat cleaning device especially suitable to clean motor vehicle mats.

BACKGROUND OF THE INVENTION

Motor vehicle mats are made with flexible polymeric materials, allowing such mats to easily fit and adhere to bodies of different types and shapes. These features of the mats represent a disadvantage with regards to their cleaning, since they adhere to and keep contact with the surfaces on which they are laid to be cleaned, which hinders access of the cleaning products (water or, in general, soapy water) to the entire mat surface, so that marks are left on said mat.

The currently existing machines and elements to carry out with the cleaning of such mats are characterized by slowness and complexity, so that they are not ideally usable when a cleaning process at an industrial level is required, that is, when daily cleaning of a great amount of mats is required. Due to the non-suitability of the machines, the operators must spend a longer period of time in the cleaning process, consequently employing excessive labour, which increases the cleaning operation cost.

Another important technical problem the devices known in the art have is the fact that, when several mats are cleaned at the same time, some of the mats may receive part of the dirty water leaking or draining from other adjacent mats, which results in new marks appearing thereon. Something similar occurs during the drying process, since water coming out from some mats may reach adjacent mats, getting them wet. This causes that the mats receiving the water take longer to get dry, and humidity stains may additionally appear thereon.

DESCRIPTION OF THE INVENTION

The present invention discloses a mat cleaning device which permits a fast and easy cleaning of the mats used in motor vehicles. The disclosed device may be used in the industrial sector, as for example in car rental companies or in car wash companies, or it can be used by individual users if the device is installed for example in petrol stations, where the user may go to get petrol and take the opportunity to wash their cars or parts thereof. Likewise, it can be used in a home environment with designs adapted for household purposes.

With this device the cleaning process may be performed in a short time, and it also may prevent marks and dirt to be produced due to accumulation of water on the mat surface or due to contact with other surfaces.

The device essentially comprises a support which can bear at least one washing basket inside of which the mat to be washed is placed. The mats are introduced in the washing basket through the top thereof and they are kept inside the basket during the cleaning operation.

The basket is a cage-like basket, with a metallic mesh on the main faces which provides it with a great portion of free surface and very little contact surface with the mat to be cleaned. The top of the metallic mesh forms its free ends and they can be curved to make it easier to introduce the mat into the basket.

The free surface of the metallic mesh permits the water jet (or a cleaning water solution) to flow through up to the mat. There is also a certain clearance between the basket and the mat, so that the horizontal and vertical marks that the metallic structure could leave on the mat are avoided.

Inside the washing basket the mats are in a substantially straight position, thus preventing them to fold up over themselves, but they do have certain mobility within the basket, which contributes to reduce the washing marks by reducing direct contact between the mat and the mesh surfaces.

The baskets are rotationally linked to the support. This rotation can be performed horizontally or vertically, according to the embodiment of the invention. This feature allows the operator to spray water (or a cleaning water solution) first on one side of the mats, then rotate the baskets until access is granted to the opposite side and finally spray water on said opposite side.

Additionally, the baskets comprise outer support elements, preferably clamps, which makes it possible to hold the mats in the outer part of the basket where they are accessible by a brush. In this way, all the stains which require brushing can be cleaned up.

In a first embodiment of the invention, the baskets rotate around their longitudinal axis, that is, they rotate horizontally. Said baskets are attached to the support by their side faces by means of rotating axes, and they are provided with a cover between their free ends on the top to prevent the mat housed inside the cage from coming out during rotation. The cover is hinged to one of the free ends of the mesh and has locking elements to prevent an undesired opening of the cover during the washing process.

The rotation of the baskets with respect to the support is carried out using rotating elements which can be manual or power-driven elements.

If the rotating elements are manual, they comprise a crank linked to the baskets rotating axes, so that when the crank is rotated the basket rotates around the horizontal axis. When the cleaning device comprises two baskets, the crank is linked to the rotating axis of one of them, and there is provided a chain transmitting the motion between said axis and the other basket rotating axis. Thus, when the crank is rotated both baskets rotate simultaneously. The manual rotation by means of the crank provides a great robustness and increases the operating lifetime of the device, as well as the requirement of reduced maintenance tasks.

The manual rotating elements additionally comprise, as a security measure for operators, a braking mechanism which makes the baskets keep rigid during the washing and which permits the baskets to rotate when the opposite side of the mat is to be cleaned.

The braking mechanism is coupled to the rotating axis of the basket and it can be actuated with the foot by pressing a pedal. On its resting position the braking mechanism is inserted in the basket rotating axis and it locks the rotation. When the operator actuates it (stepping on the pedal) the coupling gets loose and the rotation is then allowed. Upon releasing the pedal, the braking mechanism goes back to its resting position locking again the basket rotation.

If the rotating elements are power-driven ones, they comprise a motor which is connected to the basket rotating axis. If there is more than one basket, a transmission chain is arranged between the baskets rotating axes. The motor outlet is connected to a motor gear wheel so as to move said transmission chain. The motor is connected to a foot pushbutton to be remotely activated, which gives the user the possibility of using their hands to handle a water sprayer or a nozzle while activating the basket rotation.

Likewise, the device can comprise drying elements which allow the mats to be dried by means of air spraying so as to reduce the operation time noticeably. This contributes to reduce the times for the mats not to be in use due to humidity, thus reducing the time for them to be put up again in the vehicles.

In a second embodiment of the invention, the baskets perform a vertical rotation. In this embodiment the support comprises at least two horizontal bars, between which the basket is placed being attached to them by means of its transverse axis, and a vertical bar joining said horizontal bars together.

In this second embodiment the vertical bar is attached to the floor. Said vertical bar is in charge of providing stability to the support to bear forces caused by the mats weight and the pressure of the water jet being sprayed for the cleaning of said mats.

Additionally, the device comprises an opening and locking mechanism which locks the basket position during the washing operation and unlocks said position to permit vertical rotation.

To make it possible for the basket to rotate it is necessary to apply a force on a striking plate, which is part of the mechanism described and which is attached to an opening axis, so that said plate moves releasing the locking. The force applied on the striking plate can be exerted manually or by means of the pressure water jet for the washing of mats (directing it towards the striking plate).

Additionally, the device may comprise a locking bolt in one of the horizontal bars of the support. Said bolt enables to secure the baskets position. As well as preventing the baskets to rotate undesirably, the bolt may be used during washing operations including brushing so as not to force the opening mechanism elements. When the bolt is in its resting position, being through one of the horizontal bars, the baskets rotation is locked and when it moves said rotation is enabled.

Likewise, in an embodiment of the invention, the device comprises an anti-return element which prevents the rebound effect of the washing baskets when rotation is produced. When the 180° rotation has been accomplished, the anti-return element prevents the basket to go in the opposite direction.

In the first and second embodiment of the invention, the device may have two baskets in the same vertical. For the water that falls from the upper washing basket to fall directly on the floor and not onto the lower washing basket, the support vertical bars comprise a first vertical section, in which the lower basket is placed, a second section being somewhat inclined with respect to the first section, and a third vertical section in which the upper basket is placed.

The second section, by means of its inclination (preferably 90°) enables to separate the vertical plane in which the lower basket is, from the vertical plane in which the upper basket is. Thus, the occurrence of stains on the mat from the lower washing basket is prevented. The water draining from each of the washing baskets falls in the plane in which the washing basket itself is situated.

The support of this third embodiment comprises two horizontal bars between which a basket and a vertical bar, intended to be attached to the wall, are placed. The horizontal bars are hinged with respect to the vertical bar so as to enable the support to be folded up. When it is not in use, the support is folded in such a way that the basket is practically attached to the wall. When the device is to be used the support is unfolded. The basket is then positioned sufficiently away from the wall so as to enable rotation in the vertical axis, as described above.

The opening and locking mechanism, the locking bolt and the anti-return element that the device may comprise according to this third embodiment, are like those described above for the second embodiment.

In a preferred embodiment of the invention the support is made of a metallic material such as iron, steel or aluminium. Metallic materials are suitable for being used in the device since they offer a high mechanical strength and it is easy to form pieces with them, such that the support of the invention can be easily manufactured.

In case the support is made of iron, it is necessary to apply an anti-rust primer to prevent rust from being caused by the permanent contact with water and from weakening the support. Another possible option is to make the support out of steel, which offers a high mechanical strength when it is subjected to tractive efforts and compression stress thanks to the chemical contribution of its components. Furthermore, steel features great easiness for it being processed and the possibility of welding it to other steels. It may also be attached to high strength plastic materials.

DESCRIPTION OF THE DRAWINGS

In order to complement the description that is going to be made forthwith, and with the aim of aiding a better understanding of the characteristics of this invention, according to a preferred embodiment thereof, this descriptive specification is accompanied by a set of drawings, being an integral part of said description, wherein on an illustrative rather than limiting basis, the following has been represented.

PREFERRED EMBODIMENT OF THE INVENTION

A detail description of a preferred embodiment of the invention will now be made, in reference to the accompanying drawings 1 to 8.

Figure 1:
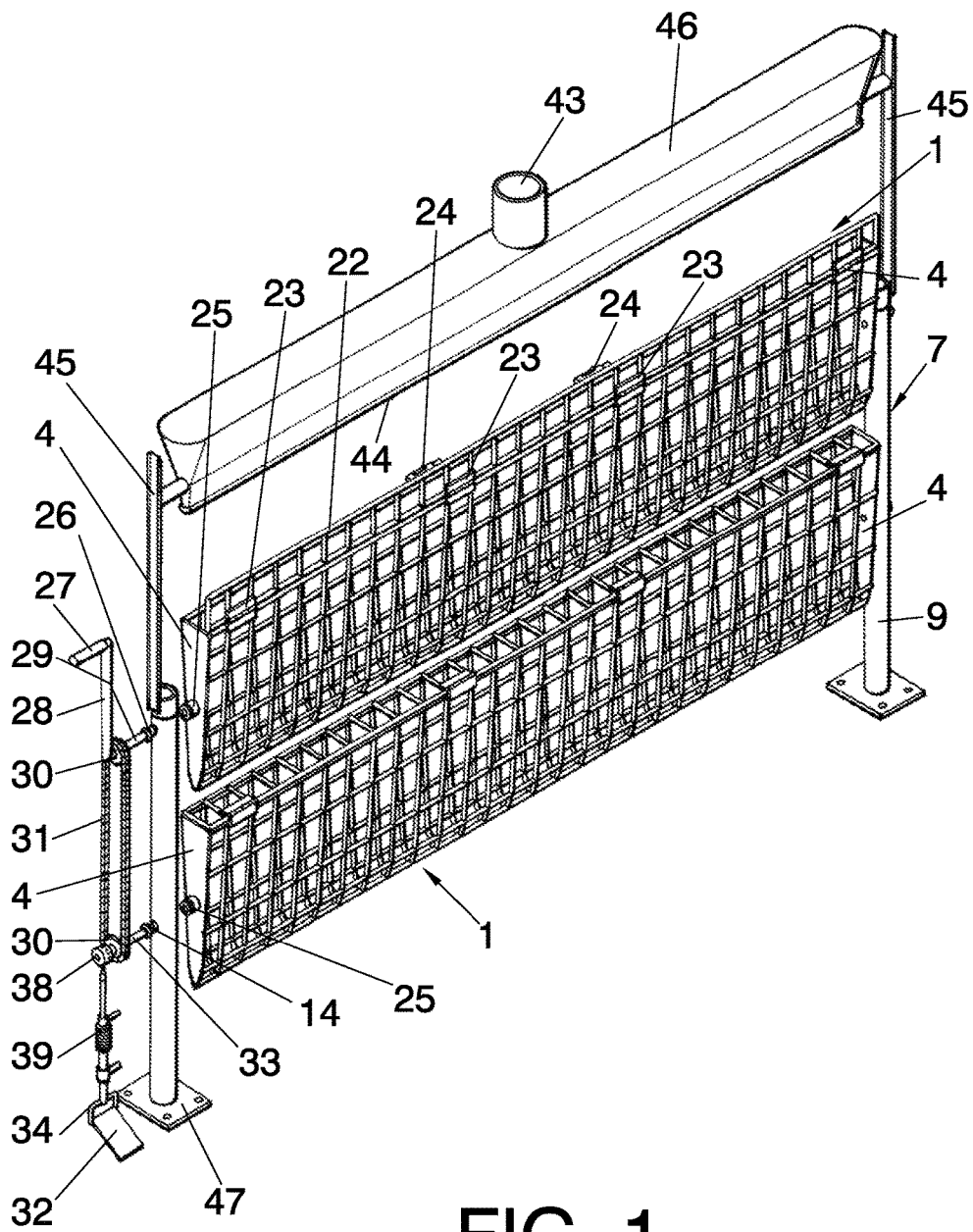
FIG. 1.—It shows a partially exploded view of the first embodiment of the mat cleaning device in which baskets rotate over their longitudinal axis, that is, over the horizontal.

The mat cleaning device according to the present invention comprises at least a washing basket (1), intended to accommodate a mat to be cleaned, as it can be appreciated in FIG. 1. The basket (1) is formed by a cage with a metallic mesh (2) which has a V configuration defined by two sections converging in a lower edge (3) and two side ends (4). Each face of the mesh (2) comprises a free end (6), opposite to the lower edge (3) and in said free end (6) there is an opening suited for the introduction of the mat in the washing basket (1).

Likewise, the device comprises a support (7), as shown in FIG. 1, intended to be a support for the basket (1). The basket (1) is rotationally linked to such support (7) by means of rotating elements, so that basket (1) rotation is enabled around the basket transversal axis or longitudinal axis, that is, vertically or horizontally.

The device may additionally comprise outer supporting elements (18) situated in the outer part of a face of the mesh (2) and enabling to support the mats outside the baskets (1) to brush them clean. The outer supporting elements (18) are preferably clamps, as it can be seen for example in FIGS. 5 and 7.

In a first embodiment of the invention, which is shown in FIG. 1, the side ends (4) have the same height than the mesh (2) and between the free ends (6) of the mesh (2) there is a cover (22) arranged to prevent the mats from coming out during the washing. The cover (22) is articulated by means of hinges (23) with one of the free ends (6) of the basket and is provided with locking elements to prevent an undesired opening thereof during the washing process, being the locking elements latches (24) manually operated.

In this first embodiment, the basket (1) is rotationally linked to the support through its longitudinal axis, that is, over the horizontal axis. The side ends (4) of the baskets (1) comprise bushings (25) projecting outwardly, accommodated in holes (26) suited for that purpose in the support (7). In this case the support (7) comprises two vertical bars (9) to which the side ends (4) of the baskets (1) attach to in the way described.

In this first embodiment the rotating elements can be manually or power-driven. FIG. 1 shows a device with manually driven rotating elements comprising a crank provided with a first end (27) that can be manually operated by an operator, and with a body (28) connected to the first end (27).

The body (28) is fixed to a rod (29) which can be inserted, through the holes (26) of one of the vertical bars (9), in a bushing (25) from the side end (4) of the basket (1). Thus, the crank (27) rotation is transmitted to the basket (1) through the rod (29).

If the device of the invention comprises two or more baskets, as it can be seen in FIG. 1, each one of them comprises its own rods (29) and additionally each one of them is provided with second gear wheels (30) connected by means of a chain (31). Thus the rotation of the rod (29) attached to the crank (27) is transmitted to the corresponding second gear wheel (30), to the chain (31), and from the chain (31) to the second gear wheel (30) of another one of the baskets (1). Thus, all the baskets (1) can be rotated simultaneously using a single crank (27).

Figure 2:
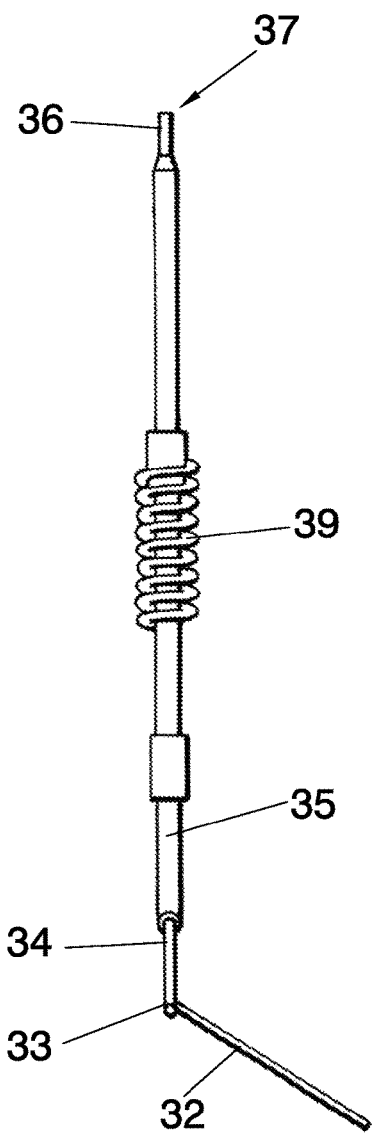
FIG. 2.—It shows a view of the braking mechanism of the device shown in FIG. 1.

The device of the invention in this first embodiment with manually driven rotation may additionally have a braking device to enable or prevent the rotation of the baskets (1) with respect to the support. Said braking device is shown in FIG. 2. It comprises a pedal (32) connected to a first end (33) of a bar (34) which is enclosed in at least part of its length by a guide (35) inside of which said bar (34) can be moved vertically.

The bar (34) moves between a first position in which there is a projection (36) arranged in a second end (37) of the bar (34), opposite to the first end (33), which is inserted in an orifice (38) arranged in the rod (29) of a basket (1), and a second position in which the projection (36) of the bar (34) is outside the orifice (38).

A tension spring (39) is fixed at an end to the bar (34) and at the other end to the guide (35), so that when the operator actuates the brake pedal (32) with their foot, the bar (34) changes from the first position to the second position, stretching the spring (39) and releasing the basket (1) so that it can rotate. When the operator releases the pedal (35), the restoring force of the spring (39) returns the bar (34) to the first position, locking again the rotation of the basket (1).

Figure 3:
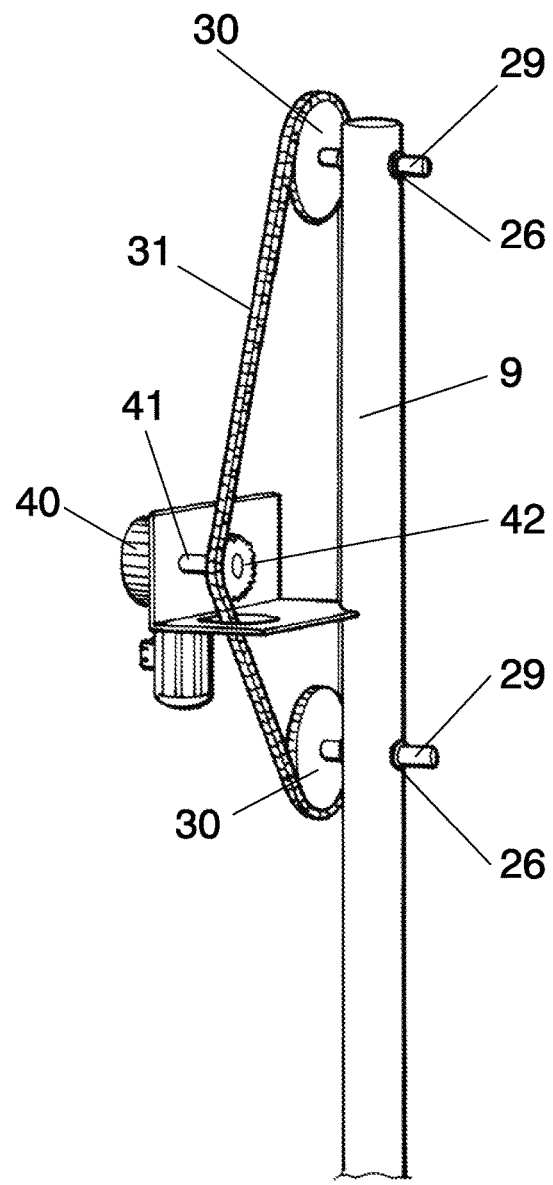
FIG. 3.—It shows a view of the rotation mechanism of the cleaning device according to the first embodiment being motor-driven.

If the rotating elements of the device are power-driven, the device may comprise an electric motor (40). FIG. 3 shows the operation of the power-driven rotating elements, which differs from the manually driven elements in the crank having been substituted by the electric motor (40). Said electric motor (40) comprises a shaft (41) provided in its free end with a first gear wheel (42) which is connected by means of a chain (31) to second gear wheels (30) associated to the baskets (1) to cause the rotation of said baskets (1). Likewise, a different type of motor can be used, such as an air motor, a hydraulic one, etc.

The device may additionally comprise drying elements shown in FIG. 1, which allow the mats to be dried by means of air spraying. The drying elements comprise a turbine (not shown) which generates an air flow, as well as a nozzle (46) provided with an upper mouth (43) connected to the turbine. The nozzle (46) comprises an air outlet (44) for an air jet to come out towards the baskets (1). The nozzle (46) is rotationally mounted on the support along the longitudinal direction of the baskets (1). Arms (45) are provided, fixed at one end to the vertical bars (9) of the support and at the other end to the nozzle (46).

The nozzle (46) is articulated with respect to the arms (45), as well as the arms (45) are rotationally articulated with respect to the support (7), in both cases around their own axis in the longitudinal direction of the baskets (1).

Figure 5:
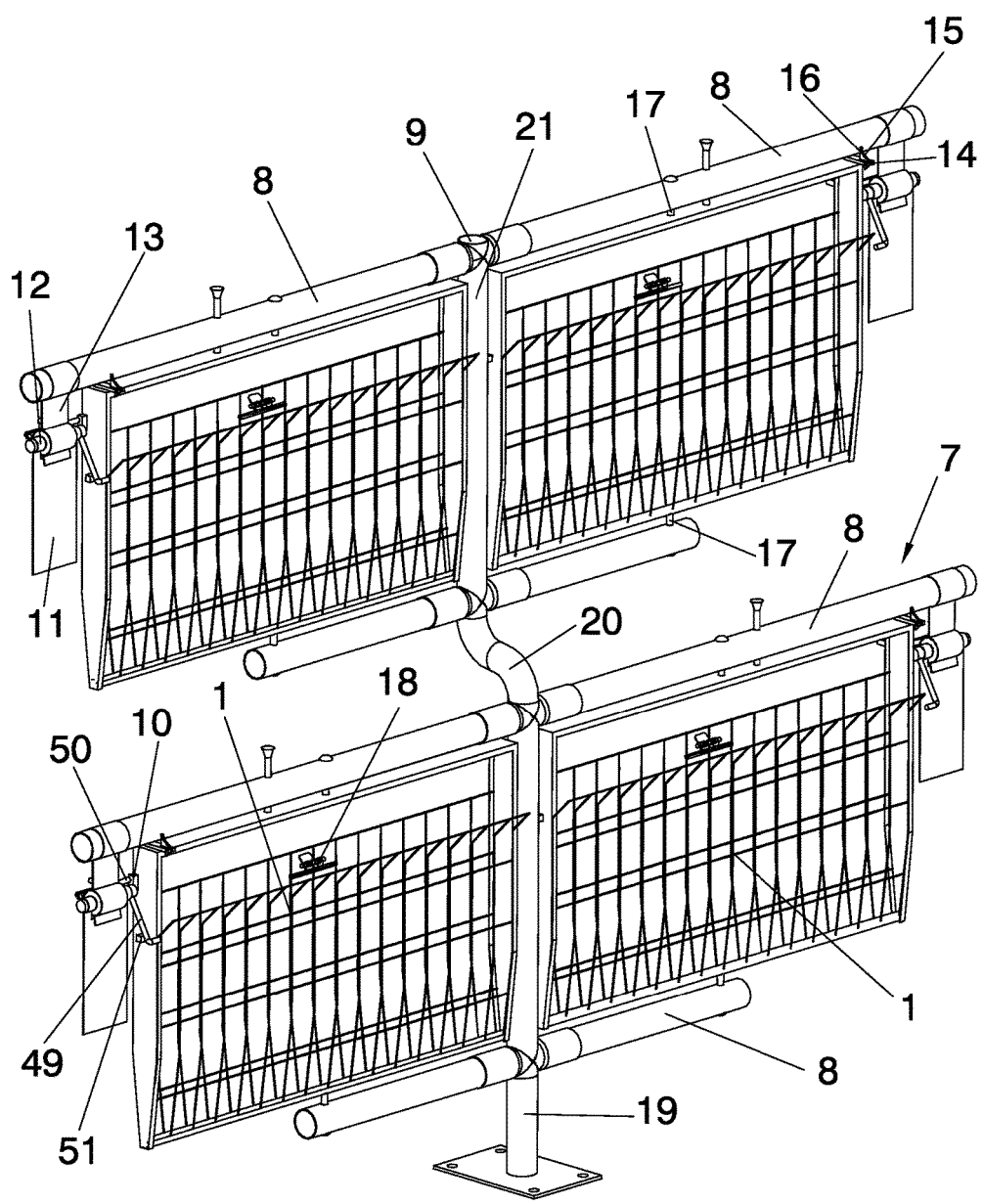
FIG. 5.—It shows a view of the second embodiment of the mat cleaning device in which the baskets rotate over their transversal axis, that is, over the vertical.

In a second embodiment of the invention shown in FIG. 5, the baskets rotate over their transversal axis, that is, in vertical direction. In this second embodiment of the invention the side ends (4) are enlarged and are higher than the mesh (2) and the upper end (5) join the side ends (4) at their top such that a space is created between the upper end (5) and the free end (6) of the metallic mesh which enables the introduction of the mat inside the basket (1).

In this second embodiment of the invention the rotating elements between the basket (1) and the support (7) is formed by axis (17) situated in the upper end (5) and in the lower edge (3), in correspondence to the transversal axis of the basket (1). The support (7) comprises at least two horizontal bars (8) joined to each other by means of a vertical bar (9). The axes (7) are shown in FIGS. 5 and 6.

In order to make the basket rotate (1) a force must be applied, being that force either the water pressure used for the cleaning process or a manual pressure that can be exerted.

In this second embodiment the free ends (6) of the mesh (2) can be curved outwardly from the washing basket (1) to make it easier to introduce the mat to be cleaned inside said basket (1).

Figure 6:
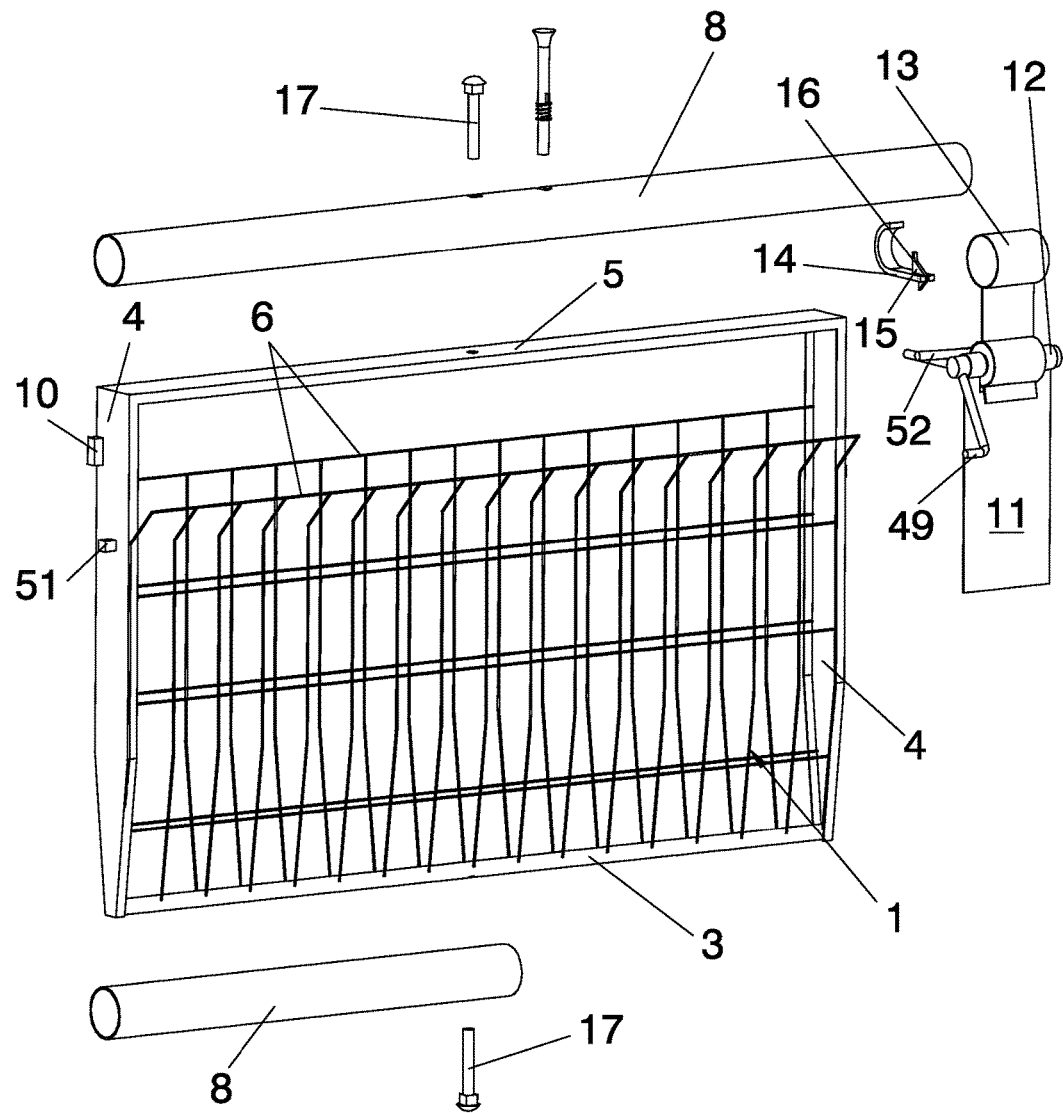
FIG. 6.—It shows an exploded view of a basket of the device shown in FIG. 5.

Likewise, the mat cleaning device comprises an opening and locking mechanism, as shown in FIG. 6, attached to a horizontal bar (8) of the support (7) through fastening elements (13). Likewise, the mechanism comprises an opening axis (12) rotationally attached to the fastening elements (13) and attached in turn to a striking plate (11). The striking plate (11) is the element on which a pressure is exerted to rotate the baskets (1). This mechanism can be clearly seen in FIG. 8.

The opening axis (12) is arranged perpendicular to the side end (4) of the basket (1) and in its free end, perpendicular thereto, there extends a lifter (48) (shown in the figure) and a striker (49) which has an end parallel to the opening axis (12). Likewise, a retaining arm (50) is arranged parallel to the opening axis (12) and in contact with the lifter (48).

As part of the opening and locking mechanism there are also some stoppers arranged in the side ends (4) of the baskets (1). In particular, a retaining stopper (10), as shown in FIG. 6, in correspondence to the retaining arm (50) of the opening axis (12) intended to block the basket (1) rotation contact each other, and a striking stopper (51) situated underneath the retaining stopper (10) intended to contact the striker (49) when the striker (49) rotates with the opening axis (12).

While in the mats cleaning position the rotation of the baskets (1) is locked. In this position the retaining arm (50) is in contact with the retaining stopper (10) avoiding the basket rotation. When pressure is exerted on the striking plate (11) (said plate can be struck either manually or spraying pressurized water for the washing process thereon), it rotates. As the plate is attached to the opening axis (12), said axis rotates together with it, with respect to the fastening elements (13). When the opening axis (12) rotates, the lifter (48) rotates as well and moves the retaining arm (50) upwards.

When the retaining arm (50) moves upwards it does not contact the retaining stopper (10) so the basket (1) can freely rotate. The necessary impulse to perform such a rotation is provided by the striker (49). Upon opening axis (12) rotation, the striker (49) rotates together with it until it contacts the striking stopper (51), providing the basket (1) with the impulse required for the rotation.

Similarly, the device comprises in this first embodiment an anti-return element which prevents the rebound effect that can be produced when, upon reaching half rotation, the basket (1) strikes against the opening and locking mechanism. This element is positioned in a horizontal bar (8) and is formed by a support (14) on which there is arranged a tilting element (15) that comprises an anti-return stopper (16). The tilting element (15) is arranged in one of the supporting ends (14) such that it tilts only in one direction. The tilting movement enables the basket (1) to go in the rotation direction and it locks the basket (1) to go in the opposite direction upon the action of the anti-return stopper (16) (which is part of the tilting element). This anti-return element is shown for example in FIGS. 5, 6 and 8.

Figure 8:
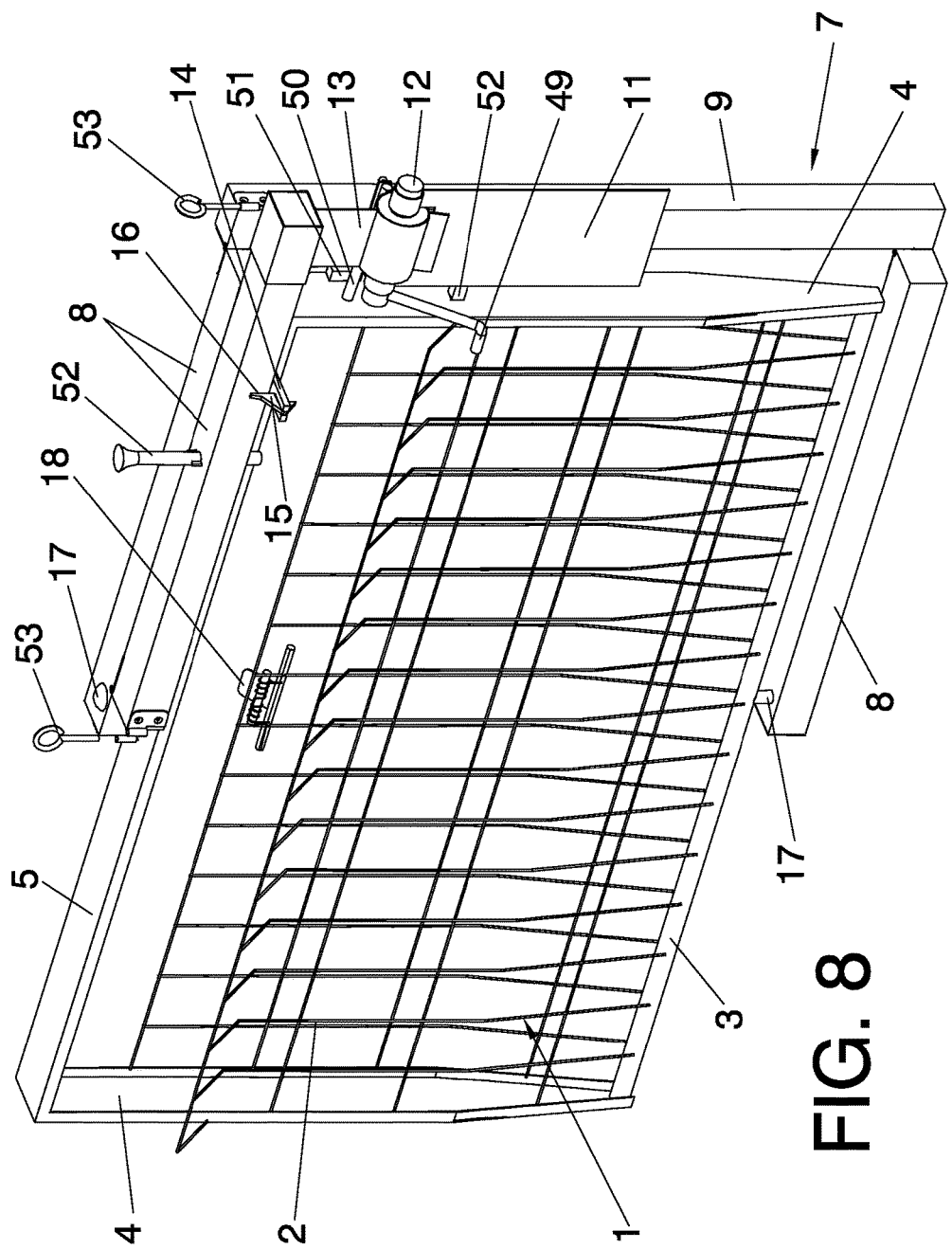
FIG. 8.—It shows a view according to the third embodiment of the mat cleaning device in a folded position.

Another alternative to lock the rotation of the baskets (1) is a locking bolt (52) which is placed in one of the horizontal bars (8). Said locking bolt (52) moves between a first position in which it goes through the horizontal bar (8) and the upper end (5) of the basket (1) locking the basket (1), and a second position in which it moves upwards and goes through the horizontal bar (8) only, enabling the basket (1) rotation. FIG. 8 shows the locking bolt (52).

The support (7) of the device of the present invention both in the first and in the second embodiment may comprise at least a vertical bar (9) attached to the floor by means of a base (47) and it is designed to arrange the baskets (1) in different vertical planes. This is done to prevent water, coming from the mats washing process in the upper basket, to fall full of dirt on the mats placed in the lower basket.

Figure 4:
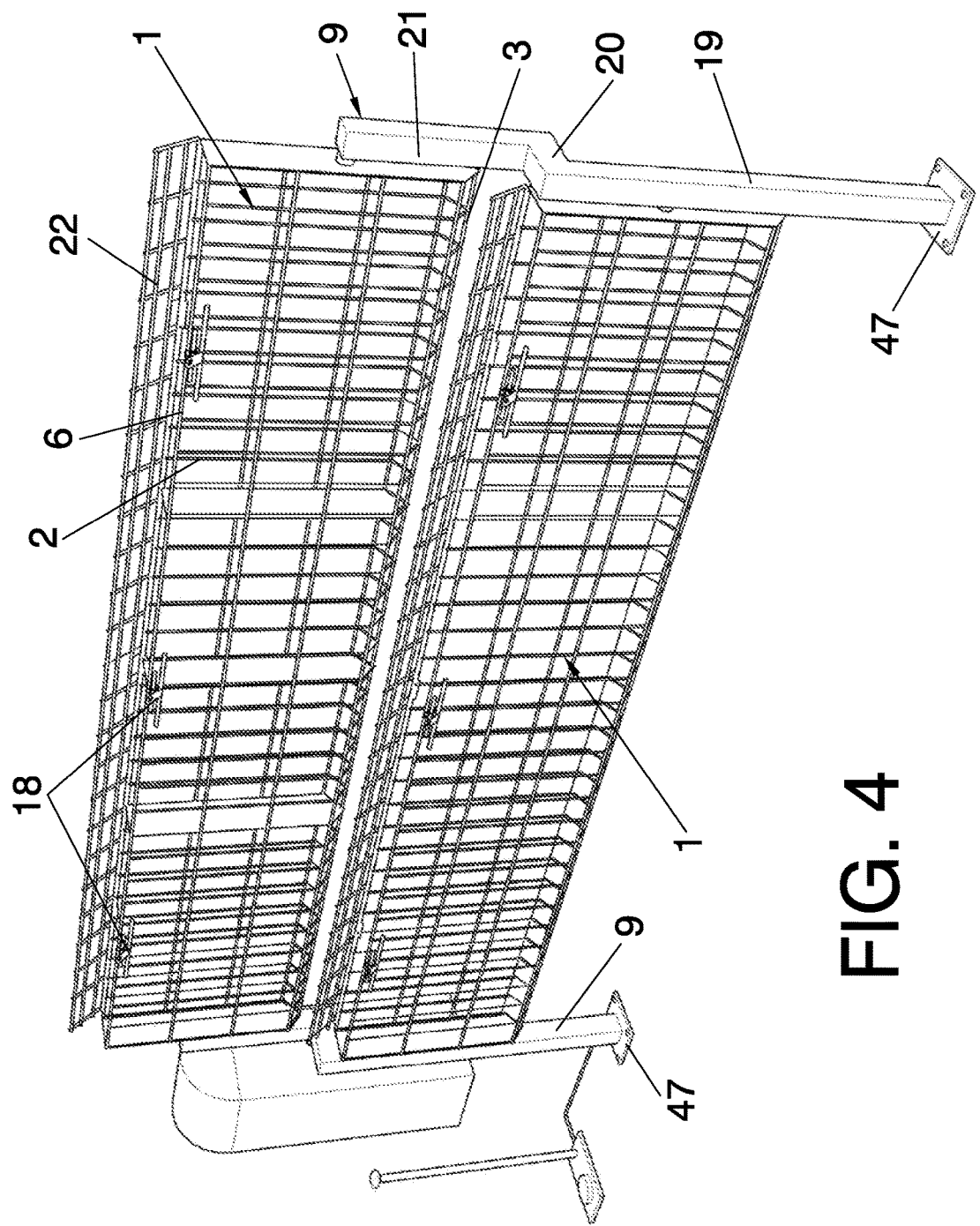
FIG. 4.—It shows a view according to the first embodiment of the mat cleaning device in which the baskets are positioned in different vertical planes, offset with respect to each other.

FIGS. 4 and 5 show embodiments of the devices in which the vertical bars (9) comprise a first section (19) starting from the base (47) in vertical direction, wherein there is arranged a basket (1), a second section (20) inclined with respect to the first section (19), and a third section (21) where another basket (1) is arranged and which extends vertically from the end of the second section (20). The basket (1) of the first section (16) and the basket (1) of the third section (21) are arranged in vertical offset planes separated from each other by the second section (20).

Figure 7:
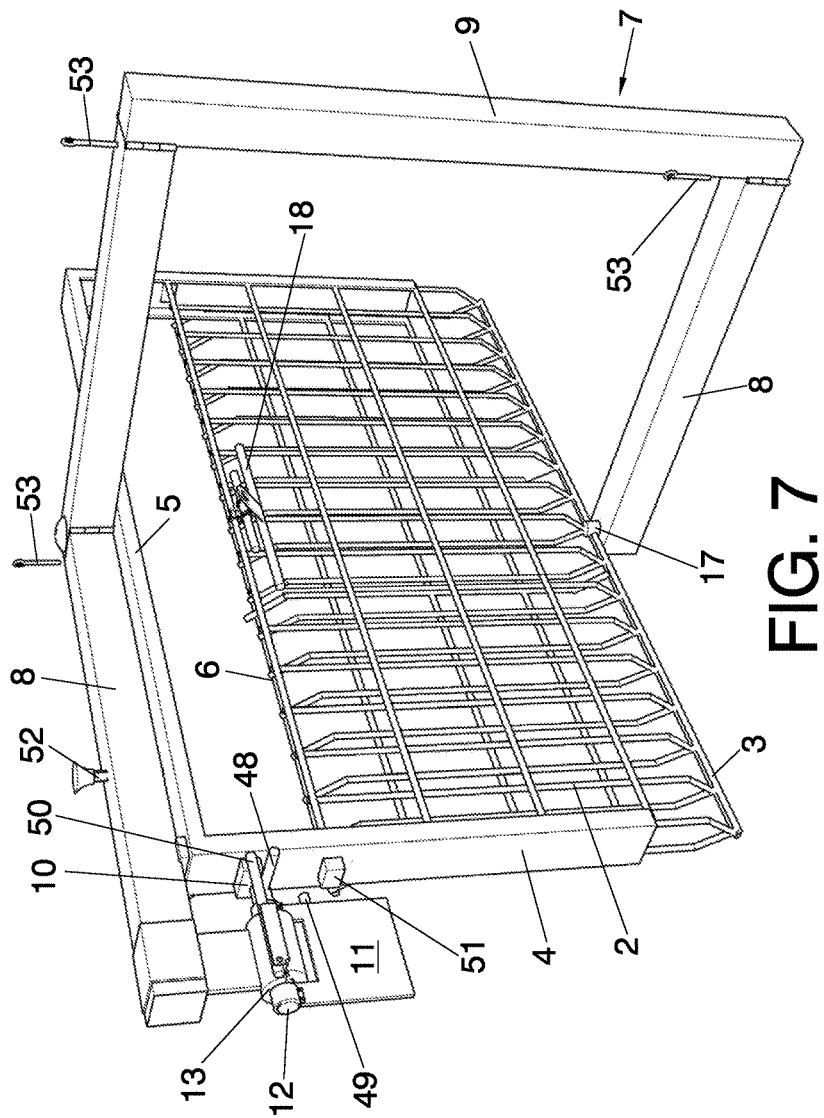
FIG. 7.—It shows a view according to the third embodiment of the mat cleaning device in an unfolded position.

In a third embodiment of the invention, shown in FIGS. 7 and 8, the baskets (1) rotate over their transversal axis, as in the second embodiment. The difference in this case is that the support (7) may be folded.

Said support (7) comprises in this case two horizontal bars (8) joined at one of its ends by means of a vertical bar (9) intended to be fixed to the wall.

In a third embodiment of the invention shown in FIGS. 7 and 8, the mat cleaning device described comprises a basket which rotates over its transversal axis, that is, in the vertical axis, as in the second embodiment, but the support can be folded. The opening and locking mechanism, the locking bolt and the anti-return element that the device can comprise in this third embodiment are like those described above for the second embodiment.

The horizontal bars (8) are attached to the vertical bar (9) in a hinged way and comprise fastening elements (53) to fix the position. In this way, the horizontal bars (8) are rotationally attached to the vertical bar (9) which is attached to the wall, since the hinged joint enables the movement of the horizontal bars (8) with respect to the vertical bar (9). The fastening elements (53) to fix the position are preferably pins placed in the hinged joints so as to lock the horizontal bars (8) movement with respect to the vertical bar (9).

Additionally, one of the horizontal bars (8) is hinged in its centre-point and it comprises fastening elements (53) to fix the position in said hinged joint, as it is shown in FIG. 7. In this way the space occupied by the device is reduced, enabling, however, the basket (1) rotation. When the device is not in use the support (7) is folded as it is shown in FIG. 8.

The invention claimed is:
1. A mat cleaning device, wherein it comprises:
at least a washing basket having the shape of a cage and intended to accommodate the mat in an adjacent arrangement, and in a non-folded position, said basket comprising:
a metallic mesh having a V configuration which is defined by two convergent sections converging in a lower edge, and having a free end opposite to the lower edge in each of the convergent sections, through which the mat is introduced in the basket, two side ends delimiting the cage sides,
a support intended to support the basket,
wherein the ends are enlarged and higher than the mesh, and the basket comprises an upper end parallel to the lower edge, joining the side ends at their top such that a space is created between the upper end and the free end of the metallic mesh so as to introduce the mat inside the basket; and
the support comprises at least two horizontal bars between which the basket is arranged, and at least a vertical bar attaching to the horizontal bars at one of their ends; and
wherein the basket is rotationally attached to the support by rotating elements such that it can rotate over a transversal axis, those rotating elements comprising axes situated in the upper end and in the lower edge of the basket, in correspon- dence to the transversal axis of the basket, and which are inserted in the horizontal bars of the support with.

2. The cleaning device of claim 1, wherein the cleaning device comprises outer supporting elements attached to the metallic mesh of the basket and enabling to hold the mat outside the basket in contact with the metallic mesh.

3. The cleaning device of claim 1, wherein the free ends of the mesh are connected by means of a cover preventing the mat from coming out of the basket during the washing process, and being articulated by means of hinges to one of the free ends of the basket, and in that it comprises manually operable latches.

4. The cleaning device of claim 1, the cleaning device comprises a braking device to prevent or enable rotation of the basket with respect to the support, wherein said braking device comprises:
   a pedal, to enable an operator to actuate the brake with the foot;
   a bar, provided with a first end and a second end, wherein the first end is connected to the pedal and the second end comprises a projection;
   a guide which encloses the bar in at least part of the length of said bar, the bar being vertically movable with respect to the guide, between a first position in which the projection is inserted in an orifice located in a rod of the basket, and a second position in which the projection is outside the orifice; and
   a tension spring, fixed at one end to the bar and at another end to the guide, so as to exert on the bar a restoring force which tends to keep the bar in the first position.

5. The cleaning device of claim 1, wherein the rotating elements are power-drivable and comprise an electric motor provided with a shaft having in its free end a first gear wheel, said gear wheel being connected by means of a chain to the second gear wheels associated to the baskets to cause rotation of said baskets.

6. The mat cleaning device of claim 1, wherein the cleaning device has drying elements that enable to dry the mats by air spraying and which comprise:
   a turbine that generates an air flow,
   a nozzle provided with an upper mouth, connected to the turbine and having an air outlet so that an air jet comes out towards the baskets,
and the device comprising arms fixed at one end to the vertical bars of the support and the nozzle is articulated with respect to the other end of the arms.

7. The cleaning device of claim 1, wherein the basket comprises an opening and locking mechanism attached to a horizontal bar of the support and comprising:
   fastening elements for being fastened to the horizontal bar,
   an opening axis rotationally attached to the fastening elements, the opening axis being arranged perpendicular to the side end of the basket and having a lifter extending in its free end perpendicular thereto, and a striker with an end parallel to the opening axis,
   a striking plate attached to the opening axis,
   a retaining arm parallel to the opening axis and arranged in contact to the lifter;
and being arranged in the side ends:
   a retaining stopper in correspondence to the retaining arm in the opening axis, intended to lock rotation of the basket, through contact with the retaining arm; and
   a striking stopper situated underneath the retaining stopper intended to contact the striker when the striker rotates together with the opening axis.

8. The cleaning device of claim 1, wherein the cleaning device comprises an anti-return element, positioned in a horizontal bar, and formed by a supporting base on which there is arranged a tilting element comprising an anti-return stopper in one of its ends, such that it tilts only in one direction.

9. The cleaning device of claim 1, wherein the cleaning device comprises a locking bolt in one of the horizontal bars, the locking bolt being movable between a first position in which it goes through the horizontal bar and the upper end of the basket, locking rotation of the basket, and a second position in which it moves upwards and goes only through the horizontal bar, enabling rotation of the basket.

10. The cleaning device of claim 1, wherein the vertical bar is attached to the floor by means of a base, the vertical bar comprising a first section starting from the base vertically, in which a basket is arranged, a second section inclined with respect to the first section, and a third section in which another basket is arranged, in such a way that the basket from the first section and the basket from the third section are arranged in offset vertical planes.

11. The cleaning device of claim 1, wherein the horizontal bars are attached to the vertical bar in a hinged way and comprise fastening elements to fix the position.

12. The cleaning device of claim 11, wherein one of the horizontal bars is hinged in its centre-point and comprises fastening elements to fix the position.

13. The cleaning device of claim 1, wherein the vertical bar is attached to the floor by means of a base, the vertical bar comprising a first section starting from the base vertically, in which a basket is arranged, a second section inclined with respect to the first section, and a third section in which another basket is arranged, in such a way that the basket from the first section and the basket from the third section are arranged in offset vertical planes.

* * * * *

UNITED STATES PATENT AND TRADEMARK OFFICE
CERTIFICATE OF CORRECTION

PATENT NO.         : 9,789,519 B2
APPLICATION NO.    : 14/420986
DATED              : October 17, 2017
INVENTOR(S)        : Cabral Betancor Page 1 of 1

It is certified that error appears in the above-identified patent and that said Letters Patent is hereby corrected as shown below:

Column 9, Claim 1, Line 2, delete "with"

Signed and Sealed this
Third Day of April, 2018

Andrei Iancu
*Director of the United States Patent and Trademark Office*